(12) United States Patent
Sobel

(10) Patent No.: US 6,205,558 B1
(45) Date of Patent: Mar. 20, 2001

(54) RECOVERY OF FILE SYSTEMS AFTER MODIFICATION FAILURE

(75) Inventor: William E. Sobel, Cypress, CA (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/167,879

(22) Filed: Oct. 7, 1998

(51) Int. Cl.[7] .................................................. G06F 11/00
(52) U.S. Cl. ............................ 714/15; 707/202; 707/205
(58) Field of Search .................................. 714/15, 16, 19, 714/36, 49, 50, 54; 707/202, 205; 711/202; 713/1, 2, 100

(56) References Cited

U.S. PATENT DOCUMENTS

| | | | |
|---|---|---|---|
| 5,241,672 | 8/1993 | Slomcenski et al. | 395/600 |
| 5,469,573 | * 11/1995 | McGill, III et al. | 395/700 |
| 5,706,472 | * 1/1998 | Ruff et al. | 395/497.04 |
| 5,956,475 | * 9/1999 | Burckhartt et al. | 395/182.21 |
| 5,974,567 | * 10/1999 | Dickson, Jr. et al. | 714/27 |

OTHER PUBLICATIONS

"Enhanced Remote Network Installation", *IBM Technical Disclosure Bulletin*, vol. 40, No. 11, Nov. 1997, U.S.A.

* cited by examiner

Primary Examiner—Robert Beausoleil
Assistant Examiner—Scott Baderman
(74) Attorney, Agent, or Firm—Fenwick & West LLP (57) ABSTRACT

Prior to execution of a file system structure modification procedure (406) which can leave the file system structure in an invalid state, a copy is made of a boot record (110), and the boot record (110) is replaced by a recovery program (130). If the file system structure modification procedure (406) fails, leaving the file system structure in an invalid state, the recovery program (130) is automatically executed when the computer is rebooted (414). In one embodiment, the recovery program (130) completes the failed file system structure modification (406). In another embodiment, the recovery program (130) rolls the file system structure back to a valid state which predates the attempted file system structure modification (406). After restoring the file system structure to an intact state, the recovery program (130) uses the copy of the boot record (110) to restore the boot record (110) to its original state. This allows for the recovery of the file system structure without intervention by a user, and without loss of information.

27 Claims, 6 Drawing Sheets

RECOVERY OF FILE SYSTEMS AFTER MODIFICATION FAILURE

FIELD OF INVENTION

This invention pertains to the field of file system modification in a digital computer system. More specifically, this invention pertains to automatic recovery from failure of file system modification.

BACKGROUND OF THE INVENTION

Typically, when a computer is powered up or reset, a sequence of events must occur in order for the operating system to "boot" (begin operation). Generally, this sequence of events occurs when a Read Only Memory (ROM) startup program is executed. The ROM startup program determines which, if any, of the attached storage devices contain or contains information sufficient to boot the operating system. For IBM PC type computers, the ROM startup program generally begins by looking to any removable storage media, generally a removable disk. If there are no removable storage media configured for booting the operating system, the ROM startup program checks a fixed storage medium, which is generally a hard-disk. Although other types of storage media are in use, for the purposes of this discussion the storage media will be assumed to be magnetic disks.

Finding a disk which is configured to boot the operating system, the ROM startup program executes a program found at the first physical sectors of the disk. For removable disks, these first sectors make up a boot record. A boot record contains a boot program that loads and executes system files on the disk for booting the operating system. For hard-disks, these first sectors make up a master boot record. The data storage space on hard-disks can generally be divided into partitions, each of which appears to the operating system as a separate disk. In order to support multiple partitions, the master boot record contains a master boot program which determines which partition is to be booted from. Typically, each partition includes a boot record at the first sectors of that partition, and the boot record contains a boot program like that of removable disks. The master boot program transfers control to the boot program contained in the appropriate partition.

There are a variety of file systems in use by different operating systems. Each of these file systems uses a different file system structure to manage data on disks. A file system structure stores information about files on the disk. Sometimes the file system structure is located at the beginning of a disk or partition, and sometimes it is located at various places throughout a disk or partition. The data on disks is generally divided into files, and the information stored in the file system structure generally includes the name and location of each file, in addition to other attributes of the files.

One common type of file system is based on a File Allocation Table (FAT). In such a file system, following the boot record on each disk or partition is a File Allocation Table (FAT). The FAT contains information for every cluster of sectors on the disk or partition, and is used as a map to indicate which clusters contain which computer-readable files. Following the FAT is a directory structure which maps specific file names to corresponding entries in the FAT. In order to locate files on a disk or partition, both the FAT and the directory structure must be intact. When the boot program loads system files to boot the operating system, it relies on the file system structure being intact. In this example, the file system structure would include the FAT and the directory structure. As the operating system is booted, it also relies on the file system structure being intact, in order to find and update files as needed. If the file system structure is damaged, or altered in an unexpected way, the operating system will likely not be able to boot from that disk. In most circumstances, a damaged FAT will result in the loss of at least some, if not all, data on the disk. There are at least three different file systems which utilize the FAT as part of a file system structure: FAT12, FAT16, and FAT32. These file systems correspond to various versions of DOS and Windows operating systems. There are other file systems, such as NTFS (for Windows NT), ODS-2 (for VMS), HPFS (for OS/2) and Ext2fs (for Linux), which use different kinds of file system structures. For example, NTFS uses a Master File Table (MFT), rather than a FAT, to keep track of files. All of these file systems, however, rely on information which constitutes a file system structure.

Many hard disk utility programs make significant modifications to file system structures. For example, a utility which converts a FAT from one format to another must reorganize the information in the FAT, as well as the directory structure. Also, utilities which change the size of partitions on a disk must significantly alter the FAT and directory structure. These operations are generally complicated, and can take a significant amount of time to complete. If there is an unexpected shut-down or reset of the system during any of these procedures, the result is often a file system structure which does not entirely conform to either the pre-modification state or the post-modification state. This resulting state is generally an invalid state. As noted above, this generally results in an unusable file system structure, and a disk which cannot boot. This is also generally accompanied by a loss of data on the disk.

Current file system structure modification programs attempt to reduce the chances of such a catastrophic failure by reducing the amount of time that a file system structure is in an invalid state. However, because some of the operations which must be performed on the file system structure are not atomic operations (which can be executed quickly and do not rely on other procedures), the possibility of a shutdown during one of these operations remains significant. Also, some of the atomic operations are themselves lengthy, and there is a chance of a failure during one of these operations.

What is needed is a method for providing for recovery from a failure of a file system structure modification.

SUMMARY OF THE INVENTION

The present invention provides for recovery from a failure of a file system structure modification procedure (406). In one embodiment of the invention, prior to execution of any file system structure modification procedure (406) which can leave the file system structure in an invalid state, a copy is made of a boot record (110), and the boot record (110) is replaced by a recovery program (130). In some implementations the boot record (110) is a master boot record. If the file system structure modification procedure (406) fails, leaving the file system structure in an invalid state, the recovery program (130) is automatically executed when the computer is restarted (414). In one embodiment, the recovery program (130) completes the failed file system structure modification (406). In another embodiment, the recovery program (130) rolls the file system structure back to a valid state which predates the attempted file system structure modification (406).

After restoring the file system structure to an intact state, the recovery program (130) uses the copy of the boot record (110) to restore the boot record (110) to its original state. This allows for recovery of the file system structure without intervention by a user, and without loss of information.

DETAILED DESCRIPTION OF THE PREFERRED EMBODIMENTS

Figure 1:
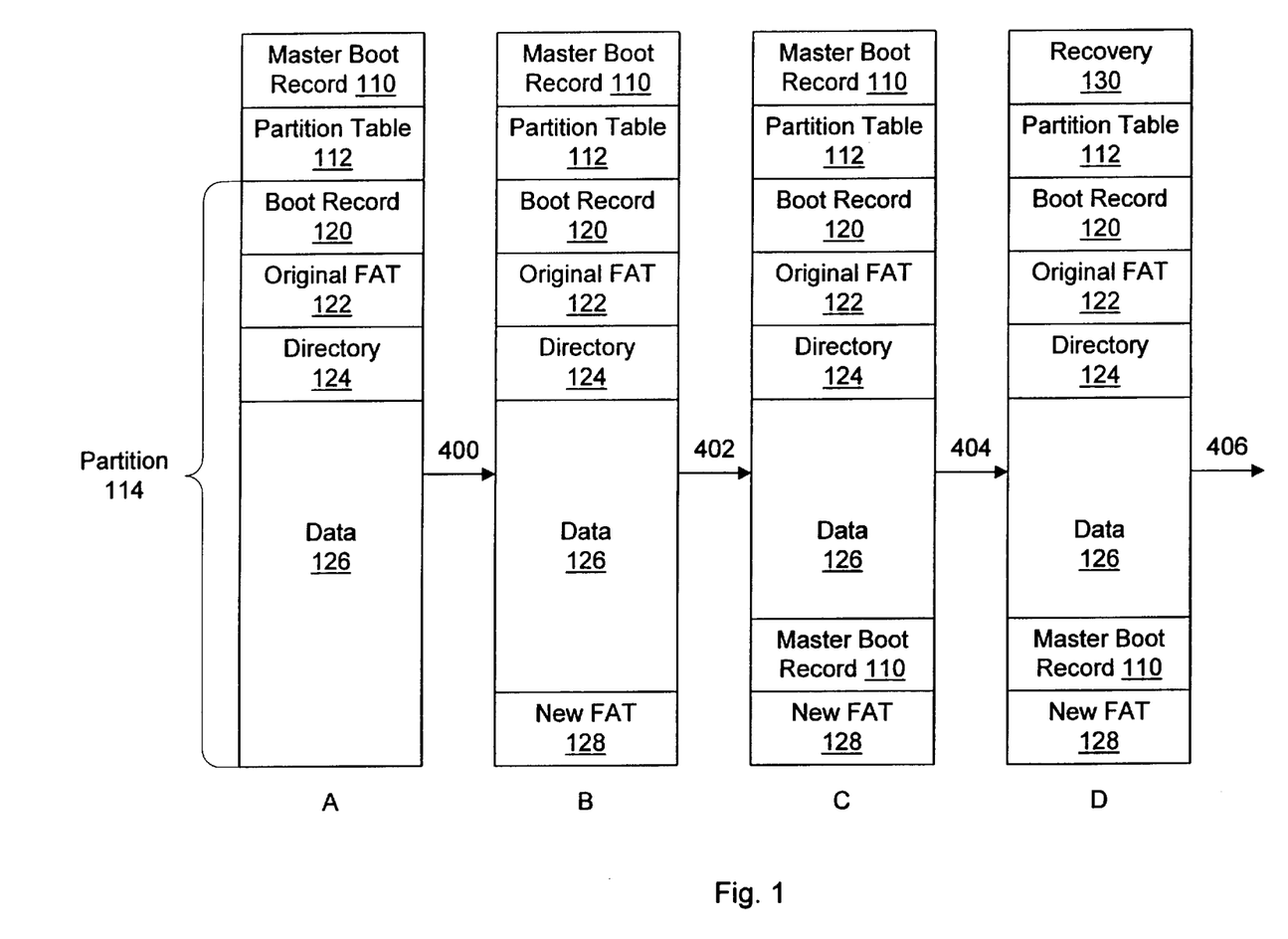
FIG. 1 illustrates a sequence of disk states A–D prior to an attempted file system structure modification procedure 406.
Figure 6:
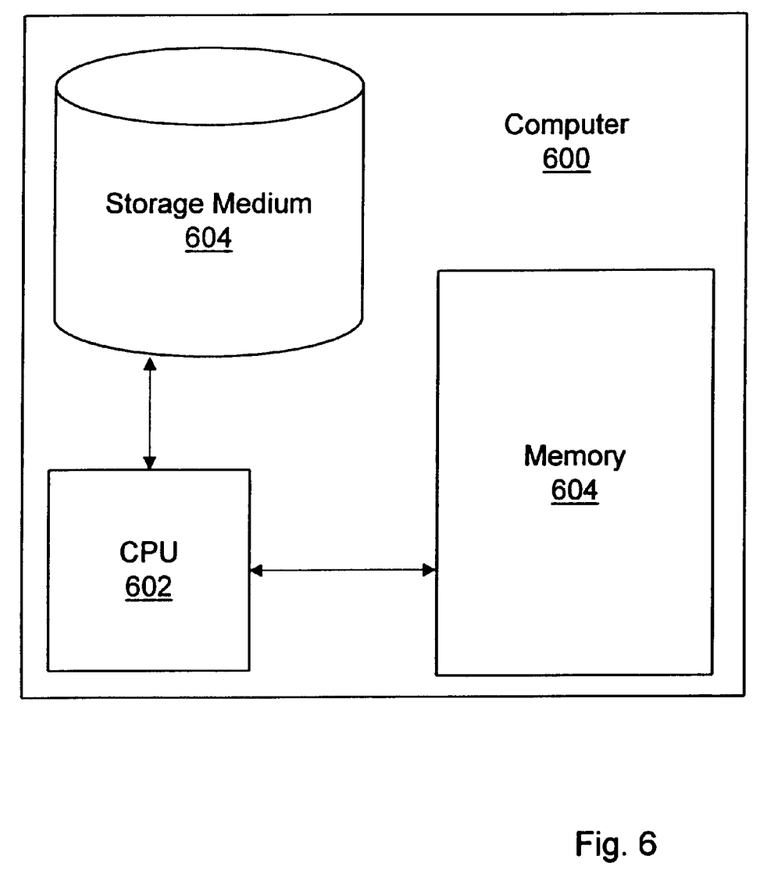
FIG. 6 is a schematic illustration of a computer 600 used in one embodiment of the invention.

Referring now to FIGS. 1 and 6, a series of hard-disk states A through D are illustrated. Disk state A corresponds to an ordinary, functional bootable disk, such as primary hard-disk 604 in computer 600. Computer 600 includes random access memory 604 as well as central processing unit (CPU) 602. All of the procedures described are carried out by CPU 602 under the direction of a program stored in memory 604.

There is only one partition 114 in disk 604 of state A, but it is understood that the present invention can be applied to systems with multiple partitions 114 as well. The first sectors on disk 604 in state A are occupied by master boot record 110 (information at the top of the disk layouts of FIG. 1 represent the first sectors on disk 604). After master boot record 110 is partition table 112, which indicates where each partition 114 is, and which partition 114 is to be booted from.

Partition 114 follows partition table 112. At the start of partition 114 is boot record 120, which contains the boot program for partition 114. Following boot record 120 in partition 114 is FAT 122 and directory structure 124. Although the file system of the illustrative embodiment is one which relies on a FAT, this is for illustrative purposes only, and the method described can also be applied to other file systems, such as NTFS, ODS-2, HPFS, and Ext2fs, which use other kinds of file system structures. FAT 122 and directory structure 124 constitute the file system structure for partition 114. This file system structure allows access to data 126 in partition 114, which makes up the rest of partition 114. The disk layout described represents a common disk layout for a functional bootable disk. Where disk 604 is divided into multiple partitions, the structure of partition 114 is repeated once for each partition.

In the embodiment described, a file system structure modification consists of new FAT 128 being substituted for old FAT 122. This takes place, for example, where the file system is changed from the FAT32 file system to the FAT16 file system. Such a change requires substantial modification of FAT 122, which can take a substantial amount of time to complete. Should there be a failure of the modification after it has begun, FAT 122 would likely be left in an unusable state.

Figure 4:
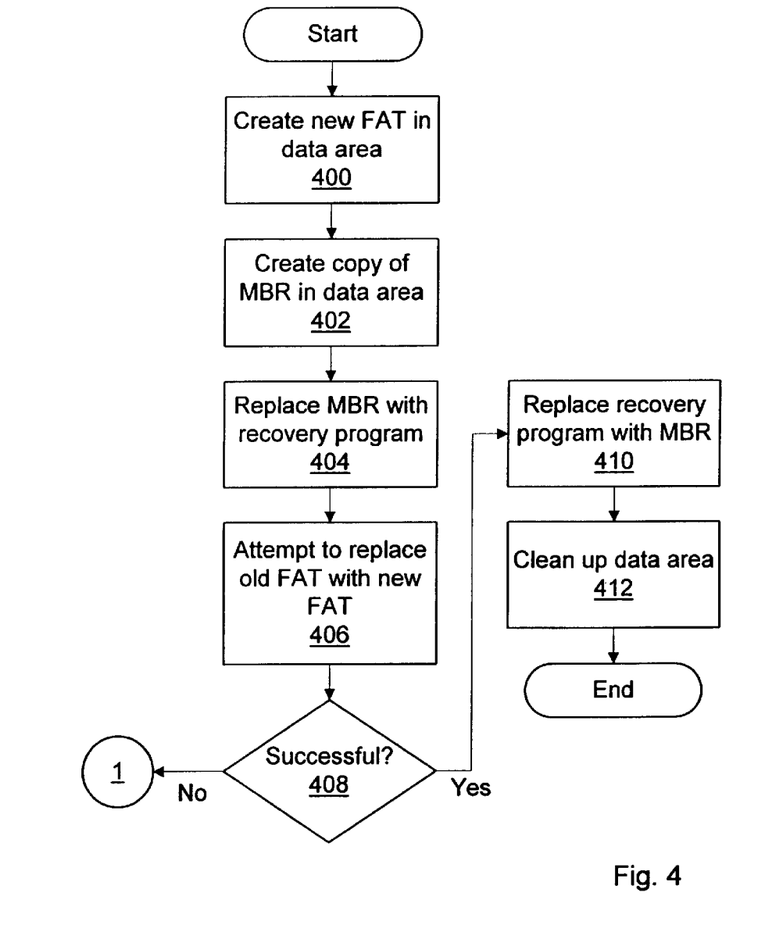
FIGS. 4 and 5 are flowcharts which illustrate the operation of one embodiment of the invention.

Prior to beginning the update of FAT 122, replacement FAT 128 is determined. The method for determining replacement FAT 128 is dependent upon the type of modification being performed, and many FAT modification procedures are known to those skilled in the art. Referring now to FIG. 4, this new FAT 128 is stored 400 somewhere in data 126. State B corresponds to the disk layout after operation 400 has been carried out. Note that at state B, new FAT 128 is illustrated at the end of data 126 for convenience, and can in reality be stored in any free area of data 126, or even in a place other than disk 604. Next, a copy of master boot record 110 is made, and stored 402 in data 126. State C corresponds to the disk layout following operation 402. Note that no changes have thus far been made to master boot record 110, boot record 120, FAT 122, or directory structure 124. A failure during any of the operations described would not ordinarily impair the file system structure, or the ability to boot up the operating system.

The first operation which affects the ability of the operating system to boot up is the copying 404 of recovery program 130 into the portion of the disk previously storing master boot record 110. Prior to this copying 404, recovery program 130 can be stored in any location convenient to the program performing the file system structure modification. State D in FIG. 1 corresponds to a disk layout in which recovery program 130 has replaced master boot record 110 in the first sectors of the disk. At this point, a system reset would cause the execution of recovery program 130, rather than the master boot program in master boot record 110. The operation of recovery program 130 is explained below.

Figure 5:
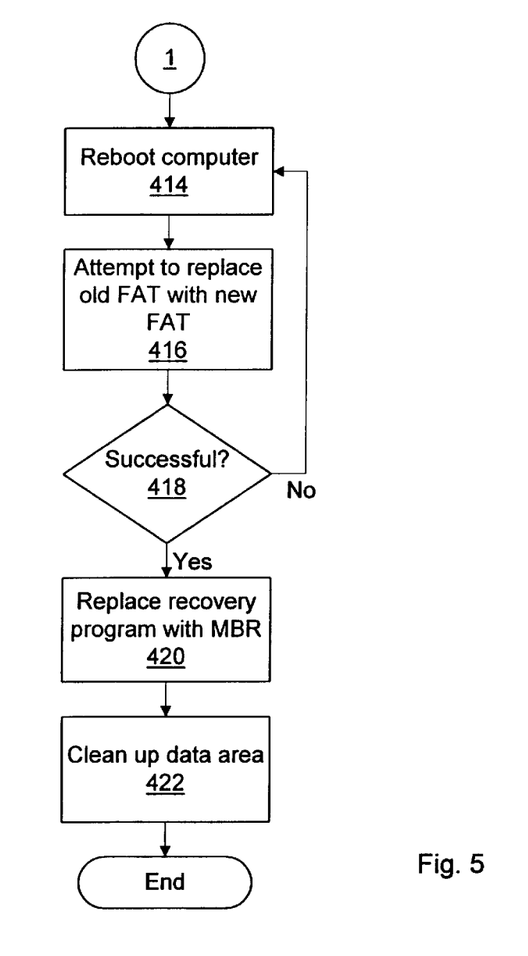

At this point, the actual file system structure modification is attempted. CPU 602 attempts 406 to copy FAT 128 from data 126 to the location previously occupied by master boot record 110. A determination is made 408 as to whether the attempted operation 406 was successful. If it was, the normal cleanup routine is implemented. Otherwise, computer 600 is rebooted 414, as shown in FIG. 5. This rebooting 414 can be carried out either by CPU 602, upon detecting a failed modification attempt, or by a user. In some instances, an untimely rebooting 414 can be the cause of the modification failure. In that case CPU 602 never reaches determination 408.

Figure 2:
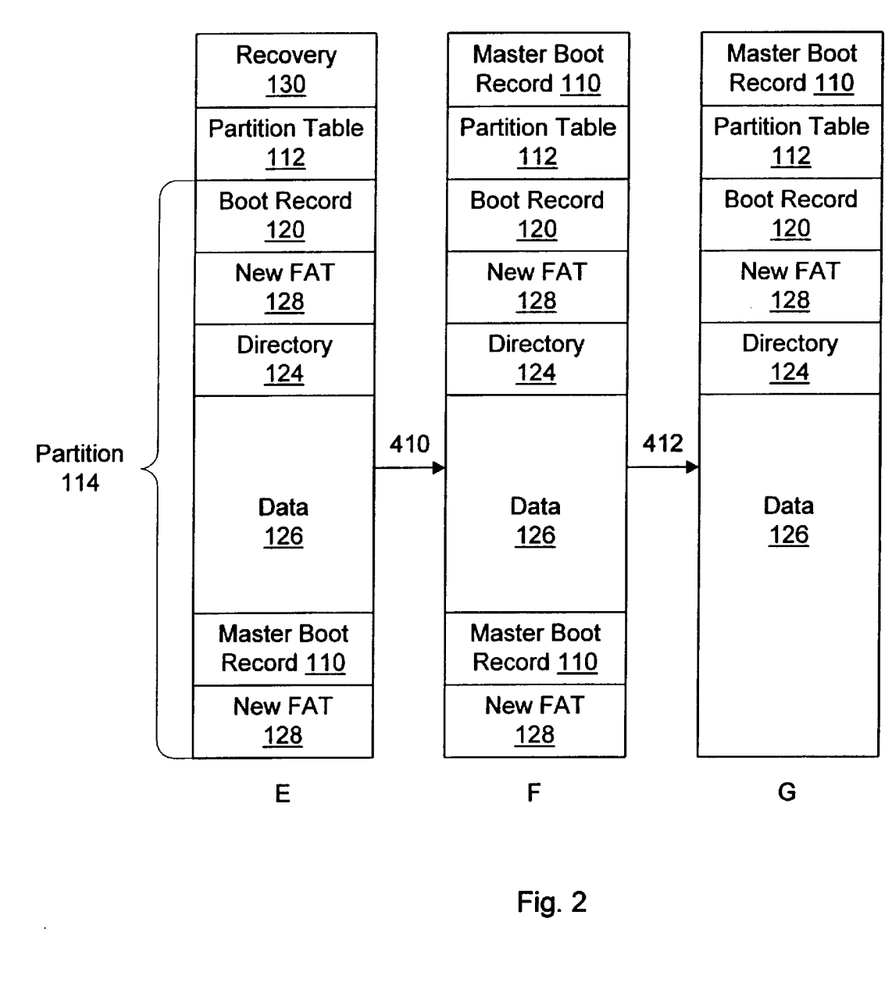
FIG. 2 illustrates a sequence of disk states E–G following a successful file system structure modification 406.

The case in which modification 406 completes successfully is described next. Referring now to FIG. 2, states E through G of disk 604 are illustrated, corresponding to a successful modification 406 of the file system structure. In state E, the file system structure modification procedure 406 has been completed, and new FAT 128 has replaced FAT 122 in partition 114. Next, the copy of master boot record 110 stored in data 126 is copied 410 back to its original location on disk 406, overwriting recovery program 130. State F corresponds to the disk layout following operation 410. Finally, data 126 is cleaned up, by deleting 412 the copy of master boot record 110 and new FAT 128 from data 126. State G corresponds to the final version of the disk layout. The only difference between state G and state A is the substitution of new FAT 128 for FAT 122. Substitution of a new directory structure for directory structure 124 or a new boot record for boot record 120 would be accomplished in substantially the same manner as described. The method described can be used to accomplish a file system structure modification under any file system.

In the method described so far, discrete steps were taken at each transition between disk layout states. If there is a system failure at a time when no transition is taking place, the file system structure should remain in a valid state. It is when a failure occurs during a transition from one state to another that there is a danger of corrupting a file system structure. As noted above, during transitions 400 and 402 no change is made to the file system structure. Consequently, these are safe transitions, and there should be no harm to the file system structure resulting from a failure during these transitions. Similarly, transition 412 involves no changes to the file system structure, and is therefore safe.

During the transitions 404 and 410, the portion of the disk ordinarily occupied by master boot record 110 is modified. A system failure during either of these transitions can lead to a system failure, because upon system startup or reboot, the system will attempt to execute code located on this portion the disk. If the operation which writes code to this portion is terminated while only partially finished, the code will likely be erroneous, leading to a failure of the system to boot. The size of master boot record 110 is generally very small. Therefore, transitions 404 and 410 will ordinarily be accomplished quickly, minimizing the risk of a failure during either transition. If such a failure does occur during one of these transitions, however, it might be possible to boot from another disk, such as a removable disk. If this can be done, the information in master boot record 110 might be reconstructed, by reinstalling the original system boot record 110. Because the file system structure is not affected by such a failure, there should be no loss of data.

Figure 3:
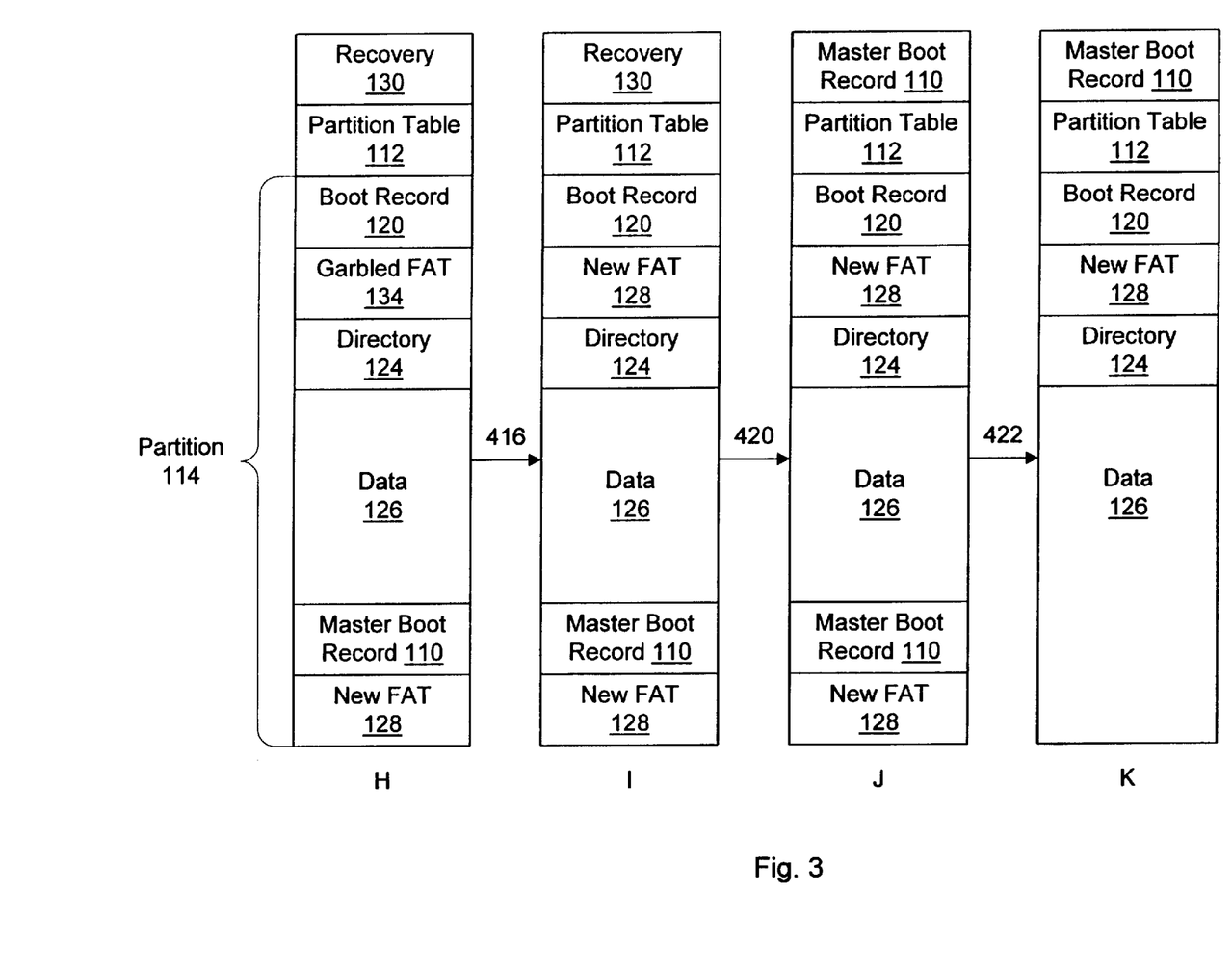
FIG. 3 illustrates a sequence of disk states H–K following a failed file system structure modification 406.

The only transition which has not thus far been addressed is transition 406, the actual copying of new FAT 128 over FAT 122. If a failure occurs during this operation, the result will likely be an invalid FAT 134, as illustrated in state H of FIG. 3. As described above, such an invalid file system structure generally leads to a catastrophic failure, and possible loss of data 126. In this case being described, however, the preventive measures carried out prior to the attempted file system structure modification 406 provide a mechanism for recovery. Upon rebooting 414 the system, control is passed to the first sectors of the disk, which are occupied by recovery program 130. Recovery program 130 instructs CPU 602 to take steps necessary to achieve a valid file system structure. In the embodiment illustrated in FIG. 3, recovery program 130 carries out 416 the file system structure modification which was being attempted at the time of failure. By copying new FAT 128 from the location in data 126 to the location currently occupied by invalid FAT 134, recovery program 130 is able to complete the failed file system structure modification 406. State I corresponds to the result of such a procedure. CPU 602 then determines 418 whether modification 416 was successful. If it was not successful, or there was another failure while recovery program 130 was running, recovery program 130 would restart upon the next system reboot 414, and again attempt to complete the copying of new FAT 128.

When the copying of FAT 128 is successfully completed, recovery program replaces 420 itself with master boot record 110, by copying the version in data 126 to the first sectors of the disk. When that has been done, disk 604 will correspond to state J in FIG. 3. A disk in state J has a functioning file system structure, and a normal master boot record 110, allowing it to boot properly when reset. At this point, the copies of master boot record 110 and new FAT 128 in data 126 are erased 422, to clean up the disk. This cleanup 422 can be performed by recovery program 130, or control can be passed to other system software for performing this function. The cleaned-up disk corresponds to state K in FIG. 3. Disk 604 in state K has the updated file system structure, and is the same as state G, the result of an initially successful modification 406.

Transition 416 affects the file system structure, as new FAT 128 is written over invalid FAT 134. However, this transition is not critical, since the file system structure is already invalid at this point. Any failure during this transition would merely result in recovery program 130 starting up at the next reset, and attempting to complete the modification. Transition 420 is the same as transition 410 in a successful file system structure modification, as described above. Similarly, transition 422 is the same as transition 412 described above.

In other embodiments, recovery program 130 can perform other functions to achieve a valid file system structure. For example, instead of completing the attempted file system structure modification 406, recovery program 130 can return the file system structure to an earlier state. In such a case, instead of storing a copy of new FAT 128 in data 126, a copy of an earlier, valid FAT would be stored. Upon failure of file system structure modification 406, the system would be returned to the earlier, valid state.

Although the replacement of a FAT has been illustrated, the invention provides a relatively safe method for modifying other file system structures. File system structure modifications can also include partitioning a hard drive, changing the partition of a hard drive and changing from one operating system to another. Those skilled in the art to which this invention pertains will understand that there are many useful file system modification functions which can benefit from being performed in the manner described. In addition to being practiced with file systems which utilize a FAT, the invention can be practiced with file systems such as NTFS, ODS-2, HPFS, and Ext2fs, which use file system structures file system structures which do not include a FAT.

It is not necessary that the information stored prior to attempted file system structure modification 406 be stored in data area 126 of the disk on which the modification is being carried out. Depending on the organization of the computer system 600, such recovery information could be stored in another location, such as another hard disk, a removable disk, or elsewhere on a computer network.

Although the example illustrated replacement of master boot record record 110 with recovery program 130, boot record 120, which is a part of partition 114, could be replaced instead, as long as partition 114 is the active partition. If another partition is the active partition, the corresponding boot record 120 would be replaced with recovery program 130. Similarly, for systems which can boot from a removable disk, recovery program 130 can be installed on a removable disk, in place of the boot record 120 on that disk.

The above description is included to illustrate the operation of exemplary embodiments and is not meant to limit the scope of the invention. The scope of the invention is to be limited only by the following claims. From the above description, many variations will be apparent to one skilled in the art that would yet be encompassed by the spirit and scope of the present invention.

What is claimed is:

1. A method of providing for recovery from a failure of a file system structure modification procedure, the method comprising the steps of:

making a copy of a boot record;

replacing the boot record with a recovery program; and subsequent to replacing the boot record, attempting to perform a modification of a file system structure.

2. The method of claim 1, wherein the recovery program comprises a set of instructions which, when executed by a processor, cause the processor to perform the steps of:

recovering from a failure of the attempted modification of the file system structure; and replacing the recovery program with the copy of the boot record.

3. The method of claim 2, wherein the step of recovering from the failure of the attempted modification of the file system structure comprises the sub-step of:

executing the modification of the file system structure.

4. The method of claim 2, wherein the step of recovering from the failure of the attempted modification of the file system structure comprises the sub-step of:

returning the file system structure to a state preceding the attempted modification of the file system structure.

5. The method of claim 1, wherein the attempted modification of the file system structure comprises attempting to change a format of a file allocation table (FAT).

6. The method of claim 1, wherein the file system structure is selected from the group consisting of FAT12, FAT16, FAT32, NTFS, ODS2, HPFS, and Ext2fs.

7. The method of claim 1, wherein the boot record resides on a fixed storage medium.

8. The method of claim 7, wherein the fixed storage medium is a non-removable storage medium from which a computer system attempts to boot.

9. The method of claim 1, wherein the boot record resides on a removable storage medium.

10. The method of claim 1, wherein the boot record resides in the same storage device as the file system structure.

11. The method of claim 1, further comprising the step of:

responsive to the attempted modification of the file system structure being successfully executed, replacing the recovery program with the copy of the boot record.

12. The method of claim 1, wherein the attempted modification of the file system structure comprises attempting to copy data from a first storage location to a second storage location.

13. A computer apparatus comprising:

a central processing unit;

coupled to the central processing unit, a first data storage device; and coupled to the central processing unit, a random access memory containing a set of instructions which, when executed by the central processing unit, cause the central processing unit to perform the steps of:

making a copy of a boot record stored in the first data storage device;

replacing the boot record in the first data storage device with a recovery program; and subsequent to the replacement of the boot record, attempting to perform a modification of a file system structure.

14. The computer apparatus of claim 13, wherein the file system structure resides on the first data storage device.

15. The computer apparatus of claim 13, wherein the file system structure resides on a second data storage device.

16. The computer apparatus of claim 13, wherein the recovery program comprises a set of instructions which, when executed by the central processing unit, cause the central processing unit to perform the steps of:

recovering from a failure of the attempted file system structure modification; and replacing the recovery program with the copy of the boot record.

17. The computer apparatus of claim 16, wherein recovering from a failure of the attempted file system structure modification comprises:

performing the file system structure modification.

18. The computer apparatus of claim 16, wherein recovering from a failure of the attempted file system structure modification comprises:

returning the file system structure to a state preceding the failed file system structure modification.

19. The computer apparatus of claim 13, wherein the attempted file system structure modification comprises changing a format of a file allocation table (FAT).

20. The computer apparatus of claim 13, wherein the file system structure is selected from the group consisting of FAT12, FAT16, FAT32, NTFS, ODS-2, HPFS, and Ext2fs.

21. A computer readable medium containing instructions which, when executed by a processor, cause the processor to perform the steps of:

making a copy of a boot record;

replacing the boot record with a recovery program; and subsequent to replacing the boot record, attempting to modify a file system structure.

22. The computer readable medium of claim 21, wherein the recovery program comprises a set of instructions which, when executed by the processor, cause the processor to perform the steps of:

recovering from a failure of the attempted modification of the file system structure; and replacing the recovery program with the copy of the boot record.

23. The computer readable medium of claim 22, wherein recovering from the failure of the attempted modification of the file system structure comprises:

executing the modification of the file system structure.

24. The computer readable medium of claim 22, wherein recovering from the failure of the attempted modification of the file system structure comprises:

returning the file system structure to a state preceding the attempted modification of the file system structure.

25. The computer readable medium of claim 21, wherein the attempted modification of the file system structure comprises attempting to change a format of a file allocation table (FAT).

26. The computer readable medium of claim 21, wherein the attempted modification of the file system structure comprises attempting to change at least one partition of the file system structure.

27. The computer readable medium of claim 21, wherein the instructions, when executed by the processor, cause the processor to perform the further step of:

responsive to the attempted modification of the file system structure being successfully executed, replacing the recovery program with the copy of the boot record.

* * * * *